United States Patent
Hashimoto et al.

(10) Patent No.: US 11,301,482 B2
(45) Date of Patent: Apr. 12, 2022

(54) ASSIST SYSTEM AND ASSIST METHOD

(71) Applicant: NIPPON TELEGRAPH AND TELEPHONE CORPORATION, Tokyo (JP)

(72) Inventors: Junko Hashimoto, Musashino (JP); Naoko Kosaka, Musashino (JP); Tsuneko Kura, Musashino (JP); Koji Kishi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/055,138

(22) PCT Filed: May 13, 2019

(86) PCT No.: PCT/JP2019/018935
§ 371 (c)(1),
(2) Date: Nov. 13, 2020

(87) PCT Pub. No.: WO2019/221060
PCT Pub. Date: Nov. 21, 2019

(65) Prior Publication Data
US 2021/0216538 A1 Jul. 15, 2021

(30) Foreign Application Priority Data
May 15, 2018 (JP) .............................. JP2018-094115

(51) Int. Cl.
*G06F 16/248* (2019.01)
*G06F 16/22* (2019.01)
*G06F 21/62* (2013.01)
*G06Q 10/10* (2012.01)
*G06Q 50/26* (2012.01)

(52) U.S. Cl.
CPC ............ *G06F 16/248* (2019.01); *G06F 16/22* (2019.01); *G06F 21/6218* (2013.01); *G06Q 10/103* (2013.01); *G06Q 10/105* (2013.01); *G06Q 50/26* (2013.01)

(58) Field of Classification Search
CPC .... G06F 16/248; G06F 16/22; G06F 21/6218; G06Q 10/103; G06Q 10/105; G06Q 50/26
See application file for complete search history.

(56) References Cited

FOREIGN PATENT DOCUMENTS

JP 5973714 B2 8/2016

*Primary Examiner* — Truong V Vo
(74) *Attorney, Agent, or Firm* — Xsensus LLP

(57) ABSTRACT

Based on a presentation rule in which a DB to be searched, a search condition, and a user terminal targeted for presentation are set, a support device transmits, to a management device, a know-how search request including a search condition corresponding to a presentation type in a presentation request according to the presentation type indicating which business the presentation of know-how is requested for. The support device integrates returned pieces of know-how information, and presents the integrated know-how information to a user terminal. The management device searches, if the requester is allowed to access the DB to be searched based on control information in which a DB to be disclosed and a type of know-how information are associated with disclosure destination information indicating a destination for disclosure.

7 Claims, 18 Drawing Sheets

Fig. 3

USER INFORMATION
D211

| USER ID | USER NAME | ORGANIZATION ID | ... |
|---|---|---|---|
| 342849 | ICHIRO YAMADA | 102200 | |
| | | | |
| | | | |

Fig. 4

| ORGANIZATION INFORMATION | | | D212 |
|---|---|---|
| ORGANIZATION ID | ORGANIZATION NAME | ... |
| 102200 | DISASTER RESPONSE HEADQUARTERS | |
| | | |
| | | |

Fig. 6

KNOW-HOW PRESENTATION RULE

| No. | KNOW-HOW PRESENTATION TYPE | USER TARGETED FOR PRESENTATION | MANAGEMENT DEVICE FOR SEARCH | DB TO BE SEARCHED | KNOW-HOW TYPE | SEARCH PARAMETER 1 | SEARCH PARAMETER 2 | SEARCH PARAMETER 3 | SEARCH PARAMETER 4 | SEARCH PARAMETER 5 |
|---|---|---|---|---|---|---|---|---|---|---|
| 1 | BUSINESS FLOW TRANSITION | SAME ORGANIZATION | 30A | ALL | ALL | TYPE | PHASE | PROCESS | | |
| 2 | BUSINESS FLOW TRANSITION | SAME ORGANIZATION | 30B | 33-b2 | ALL | TYPE | EEI | PHASE | PROCESS | |
| 3 | PERIODIC EXECUTION | ALL USERS IN BOARD | 30A | ALL | ALL | TYPE | CHECKLIST | PHASE | PROCESS | |
| 4 | WHEN COMPOSING MESSAGE | SAME USER | 30A | ALL | ALL | TYPE | MESSAGE CONTENT | PHASE | PROCESS | |
| 5 | WHEN RECEIVING MESSAGE | BOARD MANAGER | 30A | ALL | ALL | TYPE | MESSAGE CONTENT | PHASE | PROCESS | |
| | | | | | | | | | | |

| ACCESS CONTROL INFORMATION | | | D311-A |
|---|---|---|---|
| SUPPORT DEVICE AS DISCLOSURE DESTINATION | ORGANIZATION AS DISCLOSURE DESTINATION | DB TO BE DISCLOSED | KNOW-HOW TYPE TO BE DISCLOSED |
| 20A | ALL | 33-a | ALL |
| | | | |
| | | | |

Fig. 9

| ACCESS CONTROL INFORMATION | | | D311-B |
|---|---|---|---|
| SUPPORT DEVICE AS DISCLOSURE DESTINATION | ORGANIZATION AS DISCLOSURE DESTINATION | DB TO BE DISCLOSED | KNOW-HOW TYPE TO BE DISCLOSED |
| 20B | ALL | 33-b1 | ALL |
| 20B | ALL | 33-b2 | ALL |
| 20A | DISASTER RESPONSE HEADQUARTERS | 33-b2 | ALL |
| 20A | ALL | 33-b2 | CRISIS RESPONSE PUBLIC KNOW-HOW |

Fig. 10

| ACCESS CONTROL INFORMATION | | | D311-C |
|---|---|---|---|
| SUPPORT DEVICE AS DISCLOSURE DESTINATION | ORGANIZATION AS DISCLOSURE DESTINATION | DB TO BE DISCLOSED | KNOW-HOW TYPE TO BE DISCLOSED |
| ALL | ALL | 33-c | ALL |
| | | | |
| | | | |

Fig. 11

| ACCESS CONTROL INFORMATION | | | | D311-B' |
|---|---|---|---|---|
| SUPPORT DEVICE AS DISCLOSURE DESTINATION | ORGANIZATION AS DISCLOSURE DESTINATION | DB TO BE DISCLOSED | KNOW-HOW ID TO BE DISCLOSED | NECESSITY OF CONCEALMENT |
| 20A | GENERAL AFFAIRS DEPARTMENT | 33-b2 | 0001 | YES |
| | | | | |
| | | | | |

Fig. 12

KNOW-HOW TYPE INFORMATION

| KNOW-HOW DB | KNOW-HOW TYPE | ATTRIBUTE TYPE 1 | ATTRIBUTE TYPE 2 | ATTRIBUTE TYPE 3 | ATTRIBUTE TYPE 4 | ATTRIBUTE TYPE 5 |
|---|---|---|---|---|---|---|
| 33-b1 | STORM AND FLOOD DAMAGE | TYPE | EEI | PHASE | PROCESS | |
| 33-b1 | EARTHQUAKE | SCALE | EEI | PHASE | PROCESS | |
| 33-b1 | CYBER | TYPE | EEI | PHASE | PROCESS | |
| 33-b2 | CRISIS RESPONSE PUBLIC KNOW-HOW | DISASTER TYPE | EEI | PHASE | PROCESS | |
| 33-b2 | CRISIS RESPONSE SECRET KNOW-HOW | DISASTER TYPE | EEI | CREATION ORGANIZATION | PHASE | PROCESS |

KNOW-HOW INFORMATION

D313-b2

| KNOW-HOW TYPE | KNOW-HOW ID | CONTENT | CONCEALMENT | ATTRIBUTE 1 | ATTRIBUTE 2 | ATTRIBUTE 3 | ATTRIBUTE 4 | ATTRIBUTE 5 |
|---|---|---|---|---|---|---|---|---|
| CRISIS RESPONSE PUBLIC KNOW-HOW | 0001 | THERE IS A POSSIBILITY THAT THE ROAD ON THE TYPHOON'S ROUTE MAY NOT BE ABLE TO PASS, SO PLEASE CHECK THE ALTERNATIVE ROUTE AND THEN GO TO THE SITE... | DONE | TYPHOON | STATUS OF ROAD OPERATION | IMMEDIATELY AFTER OCCURRENCE | FIRST ACTION | |
| CRISIS RESPONSE PUBLIC KNOW-HOW | 0002 | BY CHECKING THE TRAIN OPERATION SCHEDULE IN ADVANCE,... | NOT YET | TYPHOON | STATUS OF RAILWAY OPERATION | IN ADVANCE | PREPARATION | |
| CRISIS RESPONSE SECRET KNOW-HOW | 0003 | INFORMATION ON THE EVACUATION CENTER CHANGES FROM MOMENT TO MOMENT, SO BE SURE TO WRITE DOWN THE DATE AND TIME OF CONFIRMATION AND FILL IN THE INFORMATION. | DONE | EARTHQUAKE | STATUS OF EVACUATION CENTER ESTABLISHMENT | STATUS OF GENERAL AFFAIRS DEPARTMENT | 3 DAYS AFTER OUTBREAK | RECOVERY |

ASSIST SYSTEM AND ASSIST METHOD

CROSS-REFERENCE TO RELATED APPLICATIONS

The present application is based on PCT filing PCT/JP2019/018935, filed May 13, 2019, which claims priority to JP 2018-094115, filed May 15, 2018, the entire contents of each are incorporated herein by reference.

TECHNICAL FIELD

The present invention relates to a support system and a support method.

BACKGROUND ART

In responding a crisis such as a natural disaster or a cyber incident, a crisis manager in a municipality or a company is required to make an important decision in a short time. However, in general, when responding to a crisis, it is rare to encounter similar situations, and thus the past experience of the manager is rarely useful. Further, although the manager is required to make a decision from limited information, rules for making such a decision are not organized.

Therefore, attempts have been made to accumulate and utilize crisis response logs generated in an organization as know-hows for the organization. For example, there has been proposed a system for accumulating and retrieving business know-hows related to crisis response in an organization (see PTL 1). In this system, the necessity of emergency response is determined from information such as monitoring items, management items, and logs which are input from an external input device, and a corresponding business unit is searched for and presented to users belonging to the organization. Further, in this system, a know-how is searched for using a business unit selected by a user as a search statement, and the know-how search result is presented to the user belonging to the organization.

CITATION LIST

Patent Literature

[PTL 1] Japanese Patent No. 5973714

SUMMARY OF THE INVENTION

Technical Problem

However, in responding to a crisis such as a natural disaster or a cyber incident, it takes time to accumulate an amount of know-hows in one organization large enough to be utilized in the organization. Even if one company acquires know-hows on measures against heavy rain, similar heavy rain does not always occur again in the area controlled by that company. Further, the company may next encounter a different crisis to be responded to, such as an earthquake, hurricane, or large-scale fire. For this reason, there is a demand for a mechanism for increasing know-how data that can be utilized by sharing know-hows among a plurality of municipalities and companies, not limited to a municipality and a company to which a user belongs.

In addition, since there is no time to search for past situations on the site in time, there is a need to automatically determine the situation to provide a know-how to a user who will need the know-how.

The present invention has been made in view of the foregoing, and an object of the present invention is to provide a support system and a support method capable of presenting know-how information accumulated among a plurality of organizations to a user at an appropriate timing in responding to a crisis.

Means for Solving the Problem

The support system of the present invention is a support system including a support device that presents know-how information related to crisis management business to a user terminal, and a management device that manages the know-how information. The support device includes a processing reception unit that receives a presentation request for the know-how information; a first storage unit that stores a presentation rule in which a database to be searched, a search condition, and a user terminal to be targeted for presentation are set in accordance with a presentation type indicating which business the presentation request is requested for; and a know-how presentation unit that transmits, based on the presentation rule in response to receiving the presentation request, a know-how search request including the search condition corresponding to the presentation type in the presentation request to a management device of the database to be searched corresponding to the presentation type, integrates pieces of know-how information returned in response to the know-how search request, and presents the integrated know-how information to the user terminal to be targeted for presentation. The management device includes a database that stores know-how information; a second storage unit that stores first control information in which a database to be disclosed and a type of know-how information to be disclosed, and disclosure destination information indicating a destination for disclosure are associated with each other; and a know-how management unit that refers to the first control information in response to receiving the know-how search request, searches the database to be searched for pieces of know-how information when the requester is allowed to access the database to be searched, and returns to the requester a piece of know-how information to be disclosed to the requester as a destination for disclosure among the pieces of know-how information searched for.

Effects of the Invention

According to the present invention, it is possible to present know-how information accumulated among a plurality of organizations to a user at an appropriate timing in responding to a crisis.

BRIEF DESCRIPTION OF DRAWINGS

FIG. 3 is a diagram illustrating an example of a data structure of user information.

FIG. 4 is a diagram illustrating an example of a data structure of organization information.

FIG. 6 is a diagram illustrating an example of a data structure of a know-how presentation rule.

FIG. 8 is a diagram illustrating an example of access control information.

FIG. 9 is a diagram illustrating an example of access control information.

FIG. 10 is a diagram illustrating an example of access control information.

FIG. 11 is a diagram illustrating an example of access control information.

FIG. 12 is a diagram illustrating an example of a data structure of know-how type information.

FIG. 13 is a diagram illustrating an example of a data structure of know-how information.

DESCRIPTION OF EMBODIMENTS

Hereinafter, an embodiment of a support system and a support method according to the present application will be described in detail with reference to the drawings. Note that the present invention is not limited to the embodiment. In the present embodiment, a case will be described as an example where the support system of the present invention is implemented as a crisis management support system.

Embodiment

[Outline of Crisis Management Support System]

Here, the crisis management support system is a system in which a municipality or a crisis management department of a company supports management business for responding to a crisis such as a disaster or a cyber incident. In addition, a board is defined as a bundle of various crisis management response businesses (tasks) for a given crisis management. In the board, various types of information necessary for performing a crisis management is gathered as task information, and the crisis management support system outputs such information to a user to support user's decision making and cooperation between organizations.

[Configuration of Ccrisis Management Support System]

Figure 1:
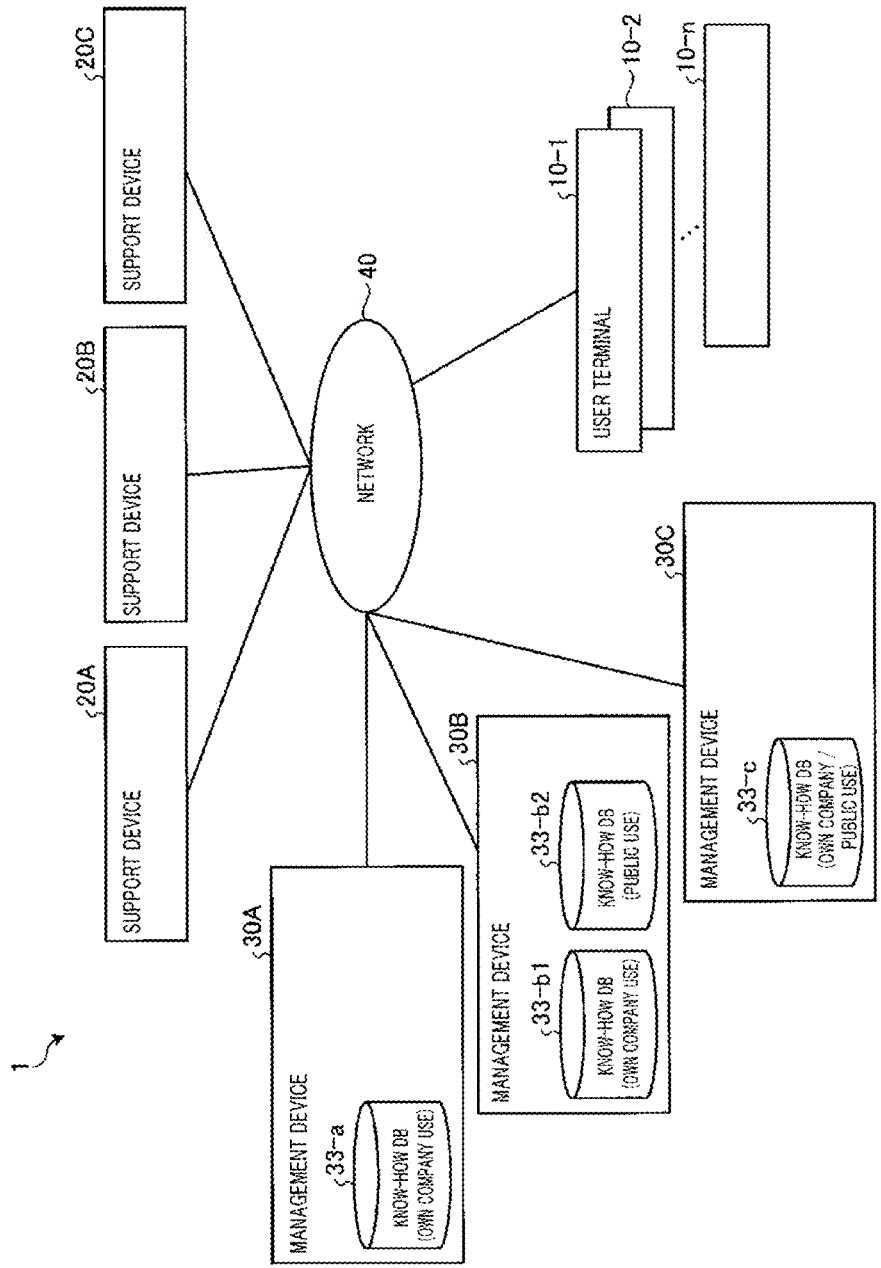
FIG. 1 is a diagram illustrating a configuration of a crisis management support system according to an embodiment.

FIG. 1 is a diagram illustrating a configuration of a crisis management support system according to an embodiment. As illustrated in FIG. 1, for example, the crisis management support system 1 according to the embodiment includes user terminals 10-1 to 10-n used by users who perform business, a plurality of support devices 20A to 20C, and a plurality of management devices 30A to 30C, which are all communicably connected to each other via a network 40.

Note that the plurality of user terminals 10-1 to 10-n are simply referred to as the user terminal 10 when they are collectively referred to without distinction. Also, the plurality of support devices 20A to 20C are simply referred to as the support device 20 when they are collectively referred to without distinction. The plurality of management devices 30A to 30C are simply referred to as the management device 30 when they are collectively referred to without distinction. Further, the crisis management support system 1 illustrated in FIG. 1 includes three support devices 20A to 20C and three management devices 30A to 30C, but the number of support devices 20 and the number of management devices 30 are not limited to them.

The user terminal 10 is, for example, a personal computer, a smartphone, a mobile phone, or the like. A user can refer to task information provided by the support device 20 by browsing the board via a Web browser of the user terminal 10. The user can also write information or a message on the board via the Web browser of his/her own user terminal 10, thereby sending the information or the message to the support device 20 or other user terminals 10. Further, the user can make a change to a business flow (a change to a task) on the board via the Web browser of his/her own user terminal 10, thereby informing about the change in the task on the board or informing the user terminal 10 of another user who is involved in the changed business flow about the change in the business flow.

In addition, the user terminal 10 can set ON or OFF for the display of know-how presentation. When the know-how presentation is set to ON, know-how information related to a crisis management business is automatically presented on a screen of the user terminal 10 during the business performed.

The support device 20 is, for example, a server device. The support device 20 manages task information including crisis response information indicating a response status of an organization to a crisis. The support device 20 provides the crisis response information to each user terminal 10 by causing the user terminal 10 installed in a subordinate organization or branch of the response headquarters to display various types of screens indicating the task information. For example, the support device 20 divides the task information into boards to which the task information belongs to manage the task information, and outputs a board that the user can browses to the user terminal 10 to provide the user with the task information. The support device 20 also registers the information transmitted from the user terminal 10 as task information in association with the related board.

Then, the support device 20 presents know-how information related to the crisis management business to the user terminal 10. The support device 20 requests the plurality of management devices 30 that manage know-how information to perform a know-how search, merges returned search results, and presents a merged result to the user terminal 10.

In this know-how presentation, the support device 20 performs processing in accordance with a know-how presentation rule. The know-how presentation rule is a rule related to the search request for know-how information to the management device 30. Specifically, the support device 20 sets, as an item of the presentation rule, a business flow indicating what kind of business is currently being performed, and sets the business flow as a search parameter of a search condition of the search request to the management device 30. As a result, based on this business flow, the support device 20 automatically determines the timing at which the search for the know-how information is required. Further, the support device 20 causes each management device 30 to search for a know-how condition related to a business of a user by setting the business flow as the search parameter of the search request to the management device 30, and automatically presents a search result of the know-how information to the user terminal 10 of the user.

The management device 30 includes a know-how database (DB) 33 for registering know-how information related to crisis management business, and manages the know-how information registered in the know-how DB 33. When receiving the search request for know-how information from the support device 20, the management device 30 searches the know-how DB 33 for pieces of know-how information using search parameters including the business flow if the support device 20, which is the requester, is allowed to access the know-how DB 33. The management device 30 returns, to the support device 20, which is the requester, a pieces of know-how information that is permitted to be disclosed to the support device 20, which is the requester, among the pieces of know-how information searched for.

The network 40 only needs to be configured so that the connected devices can communicate with each other, and can be composed of, for example, the Internet, a LAN (Local Area Network), a WAN (Wide Area Network), or the like.

In the example of FIG. 1, for example, the support device 20A and the management device 30A are managed by Company A. The management device 30A also manages a know-how DB 33-a that stores know-how information. The destination for disclosure of the know-how DB 33-a is limited to the company (support device 20A) to which it belongs.

The support device 20B and the management device 30B are managed by Company B. The management device 30B manages know-how DBs 33-b1 and 33-b2. The destination for disclosure of the know-how DB 33-b1 is limited to the company (support device 20B) to which it belongs. The destinations for disclosure of the know-how DB 33-b2 are the company (support device 20B) to which it belongs and an organization company A, "disaster response headquarters", so that know-how information in which a know-how type is "crisis response public know-how" is disclosed only to Company A (support device 20A).

The support device 20C and the management device 30C are managed by a municipality C. The management device 30C manages a know-how DB 33-c. The know-how DB 33-c can be referred to by all the support devices 20A to 20C without limiting the destination for disclosure.

Figure 2:
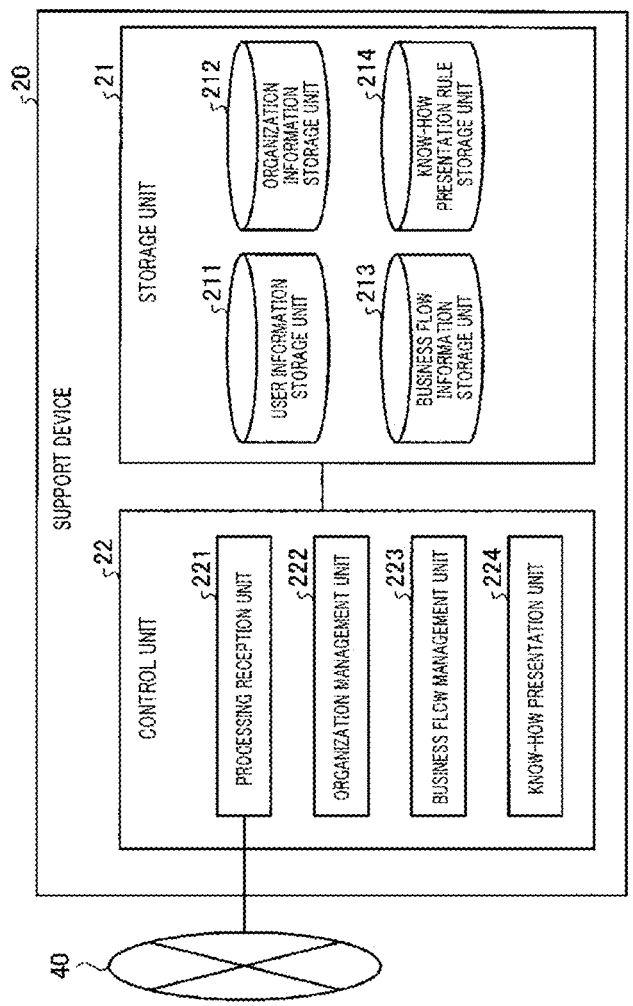
FIG. 2 is a block diagram illustrating a configuration of a support device illustrated in FIG. 1.

[Configuration of support device] A configuration of the support device 20 will be described in detail. FIG. 2 is a block diagram illustrating the configuration of the support device 20 illustrated in FIG. 1. As illustrated in FIG. 2, the support device 20 includes a storage unit 21 (first storage unit) and a control unit 22.

The storage unit 21 is implemented by a semiconductor memory device such as a RAM (Random Access Memory) or a flash memory, or a storage device such as a hard disk or an optical disk, and stores a processing program for operating the support device 20, data used during execution of the processing program, and the like.

When an operation manager is appointed to operate the support device 20, the operation manager registers information necessary for crisis response, such as organization information and user information in order to permit the use of the system. The storage unit 21 stores such information. Further, the storage unit 21 stores, as crisis response information related to crisis response, a business flow in which identification information indicating a task is associated with each response instruction and each response content included in a response business, and the like, and also a know-how presentation rule used for presenting a know-how.

Accordingly, the storage unit 21 includes a user information storage unit 211, an organization information storage unit 212, a business flow information storage unit 213, and a know-how presentation rule storage unit 214. The storage unit 21 also stores, as a board, a bundle of various crisis management response businesses (tasks).

The user information storage unit 211 stores information indicating user information of the support device 20. The user information holds information about which organization each user belongs to. FIG. 3 is a diagram illustrating an example of a data structure of the user information. As illustrated in a table D211 of FIG. 3, a user ID, a name, a belonging organization ID, and the like are registered in each piece of user information. In the table D211, for example, "Ichiro YAMADA" with user ID "342849" and belonging organization ID "102200" is registered as a user who is to respond to a crisis management business of a certain company.

The organization information storage unit 212 stores an organization management table indicating an organization for responding to a crisis in a municipality or a company having the support device 20. The organization information holds information for identifying organizations. FIG. 4 is a diagram illustrating an example of a data structure of the organization information. As illustrated in a table D212 of FIG. 4, an organization ID and an organization name are registered in each piece of organization information. In the table D212, for example, "disaster response headquarters" with organization ID "102200" is registered as an organization for responding to a crisis management business of a certain company.

The business flow information storage unit 213 stores business flow information for crisis response. In the crisis management business, in order to carry out the business smoothly, a business flow of how to carry out the business may be created in advance so that the business can be performed according to the business flow. For example, the business flow information is created in a format in which identification information indicating a crisis is associated with a flow of a business for responding to the crisis.

Figure 5:
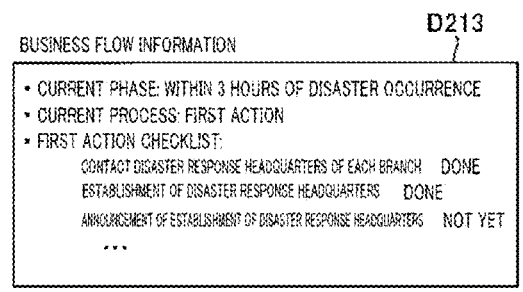
FIG. 5 is a diagram illustrating an example of a data structure of business flow information.

FIG. 5 is a diagram illustrating an example of a data structure of the business flow information. As illustrated in a list D213 of FIG. 5, each piece of business flow information includes a current phase for a crisis, a current process, each response instruction and each response content included in a response business, its checklist, and the like. In this way, as business flow information, for example, a "mission pack" is applied that defines, in the form of checklist along a linear time axis, actions to be performed at each site on the basis of the occurrence of a disaster, such as before the disaster, within 3 hours of the disaster, and within 3 days of the disaster.

The know-how presentation rule storage unit 214 stores a know-how presentation rule in which a database to be searched, a search condition, and a user terminal to be targeted for presentation are set in accordance with a presentation type indicating which business a presentation request for know-how information is requested for. In other words, the know-how presentation rule storage unit 214 holds a know-how presentation rule indicating that know-how information for which database of which system is to be searched with what search condition and which is to be presented to which user.

FIG. 6 is a diagram illustrating an example of a data structure of the know-how presentation rule. As illustrated in a table D214 of FIG. 6, the know-how presentation rule includes items of know-how presentation type, user targeted for presentation, management device for search, DB to be searched, know-how type, and search parameters 1 to 5. The know-how presentation type indicates a type of business related to know-how presentation for which a request is received.

For example, serial number "1" is set for a business related to the know-how presentation request of "business flow transition", that is, for a know-how presentation type of "business flow transition". Specifically, the user targeted for presentation is a user terminal 10 that belongs to the "same organization" as a user terminal 10 which is the requester, and pieces of know-how information with "all" the types in "all" the DBs of the "management device 30A" are to be searched for. At this time, "type", a time axis of "phase", and a crisis response business of "process" can be set as the search parameters of the search condition. Thus, among the items of the business flow, information such as which phase and which process to be "at present", and which check item of the mission pack has not been done "at present", are included in the know-how search request as parameters. This makes it possible for the support device 20 to perform a search request for know-how information that matches the current business status.

Further, as illustrated in the item of user targeted for presentation, the know-how presentation rule may include, as user terminals 10 targeted for presentation, in addition to a user terminal 10 which is the requester, a user terminal belonging to the same organization as the user terminal 10 which is the requester as well as a user terminal that shares the same business flow with the user terminal 10 which is the requester.

Note that, if only one management device 30 is provided in the entire crisis management support system 1, the column of system for search in the know-how presentation rule is not necessary. Further, if each management device 30 includes only one know-how DB 33 in the entire crisis management support system 1, the column of DB to be searched in the know-how presentation rule is not necessary. Further, if there is only one know-how type in the entire crisis management support system 1, the column of know-how type in the know-how presentation rule is not necessary and the column of search parameter is different for each know-how type.

The control unit 22 includes an internal memory for storing programs defining various types of processing procedures and necessary data, and executes various steps of processing using them. For example, the control unit 22 is an electronic circuit such as a CPU (Central Processing Unit) or an MPU (Micro Processing Unit). The control unit 22 also includes a NIC (Network Interface Card) or the like, and communicates with other devices via a telecommunication line such as a LAN or the Internet. The control unit 22 includes a processing reception unit 221, an organization management unit 222, a business flow management unit 223, and a know-how presentation unit 224.

The processing reception unit 221 includes an input/output interface to receive an instruction related to task information. The processing reception unit 221 receives operation data input by an operation on the user terminal 10, receives the operation data, and outputs the operation data to each processing unit. Then, the processing reception unit 221 outputs information processed by the control unit 22 to the user terminal 10. In addition, the processing reception unit 221 receives a presentation request for know-how information related to a business.

The organization management unit 222 manages organization information indicating organizations managed by the support device 20. When the content of the organization information is changed, the organization management unit 222 transmits a change request for the organization information to the related management device 30. When a piece of organization information is deleted, the organization management unit 222 transmits a delete request for the piece of organization information related to the support device 20 to the related management device 30.

The business flow management unit 223 transitions the business flow in accordance with the request from the processing reception unit 221. For example, the transition of the business flow means the shift from phase "A" to phase "B". As described above, in the crisis management business, in order to perform the business smoothly, a business flow of how to carry out the business is created in advance, and the business is performed according to the business flow. In light of which part of the sequential business flow is being performed, the business to be carried out at present will change. In this case, the business flow management unit 223 transitions the business flow related to the crisis management business, and changes the business flow information related to the crisis management business to a flow related to the business to be carried out at present.

When the processing reception unit 221 receives the presentation request, the know-how presentation unit 224 refers to the know-how presentation rule in the know-how presentation rule storage unit 214. Then, the know-how presentation unit 224 transmits a know-how search request including a search condition corresponding to a presentation type in the presentation request to the management device 30 for the know-how DB 33 to be searched corresponding to the presentation type, based on the referenced know-how presentation rule.

Subsequently, the know-how presentation unit 224 integrates (merges) pieces of know-how information returned from the management device 30 in response to the know-how search request, and presents the integrated know-how information to the user terminal(s) 10 targeted for presentation. At this time, the know-how presentation unit 224 merges the know-how information returned in response to the know-how search request, and causes the user terminal(s) 10 to which the know-how information is permitted to be disclosed, that is, the user terminal(s) 10 for which display of the know-how information is set to ON, among the user terminals 10 targeted for presentation, to display the merged know-how information.

When receiving the presentation request, the know-how presentation unit 224 transmits, to the management device 30, a know-how search request including organization information targeted for presentation, as a search parameter of the search condition of a know-how search request, as included in the items of the know-how presentation rule. The know-how presentation unit 224 transmits, to the management device 30, a know-how search request including a type of know-how information and a search parameter specified for each type, as a search condition of the know-how search request, as included in the items of the know-how presentation rule. Further, the know-how presentation unit 224 transmits, to the management device 30, a know-how search request including the current business flow information as a search parameter, as included in the items of the know-how presentation rule.

[Configuration of Management Device]

Figure 7:
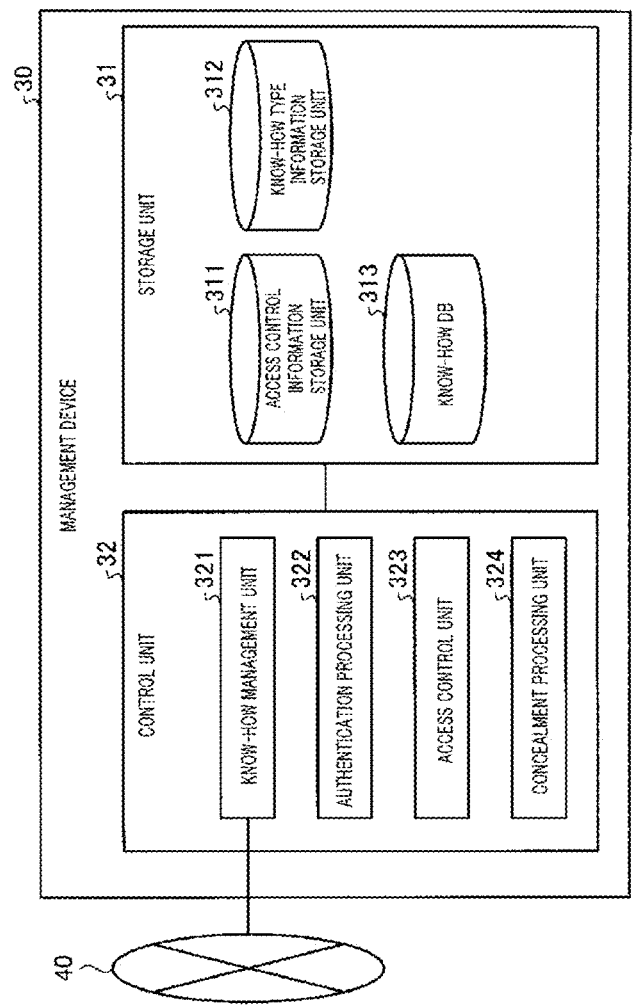
FIG. 7 is a block diagram illustrating a configuration of a management device illustrated in FIG. 1.

Next, a configuration of the management device 30 will be described in detail. FIG. 7 is a block diagram illustrating the configuration of the management device 30 illustrated in FIG. 1. As illustrated in FIG. 7, the management device 30 includes a storage unit 31 (second storage unit) and a control unit 32.

The storage unit 31 is implemented by a semiconductor memory device such as a RAM or a flash memory, or a storage device such as a hard disk or an optical disk, and stores a processing program for operating the management device 30, data used during execution of the processing program, and the like. The storage unit 31 includes an access control information storage unit 311, a know-how type information storage unit 312, and the know-how DB 33. The management device 30 holds a plurality of know-how DBs 33.

The access control information storage unit 311 stores access control information (first control information) in which a database to be disclosed and a type of know-how information to be disclosed are associated with disclosure destination information indicating a destination for disclosure. The access control information includes, as the disclosure destination information, information on the support device which is a destination for disclosure or organization information of a destination for disclosure. Further, the access control information associates a type of know-how information with the support device 30 which is a destination for disclosure and the organization information of a destination for disclosure. In other words, the access control information is information indicating to which support device 20 or which organization and which support device 20, which type of know-how information in which know-how DB 33 is to be presented.

FIGS. 8 to 10 are diagrams illustrating examples of the access control information. A table D311-A in FIG. 8 is stored by the management device 30A. In the table D311-A, an access control content is associated with each type of know-how information. Specifically, as illustrated in the table D311-A, the access control information is set with items such as the support device which is a destination for disclosure, the know-how DB to be disclosed, and the type of the know-how information to be disclosed. The example of the table D311-A indicates that all the types of know-how information in the know-how DB 33-a managed by the management device 30A can be disclosed to all the organizations of the support device 20A of Company A.

Further, a table D311-B in FIG. 9 is stored by the management device 30B. In the table D311-B, destinations for disclosure and types of know-how information to be disclosed are set for each of the know-how DBs 33-b1 and 33-b2, which are managed by the management device 30B. For example, in the first row of the table D311-B, it is set that all types of know-how information for the know-how DB 33-b1 can be disclosed to all organizations of the support device 20B of Company B to which it belongs. Further, in the fourth row of the table D311-B, it is set that the know-how information belonging to a type of "crisis response public know-how" for the know-how DB 33-b2 can be disclosed to all organizations of the support device 20A of Company A which is another company.

Further, a table D311-C in FIG. 10 is stored by the management device 30C. In the table D311-C, it is set that all types of know-how information for the know-how DB 33-c managed by the management device 30C can be disclosed to all organizations in all the support devices 20 without being limited to the company and other companies.

As a result, according to the access control information illustrated in FIGS. 8 to 10, the support device 20A can search the know-how DB 33-1 of the management device 30A. Further, the support device 20A can search the know-how DB 33-b2 of the management device 30B for the know-how type "crisis response public know-how" and search the know-how DB 33-c of the management device 30C. In addition, the "disaster response headquarters" using the support device 20A can search the know-how DB 33-b2 of the management device 30B. Further, the support device 20B can search the know-how DBs 33-b1 and 33-b2 of the management device 30B and the know-how DB 33-c of the management device 30C. Further, the support device 20C can search the know-how DB 33-c of the management device 30C.

Note that if there is provided only one support device 20 as a destination for disclosure, the column of support device as disclosure destination in the access control information is not necessary. Further, if the management device 30 has only one know-how DB 33, the column of DB to be disclosed in the access control information is not necessary. Further, when there is only one type of know-how information, the column of know-how type in the access control information is not necessary.

In addition, the access control information storage unit 311 stores access control information (second control information) in which identification information of know-how information and a concealment necessity flag indicating whether or not concealment is required are associated with each other. FIG. 11 is a diagram illustrating an example of the access control information. A table D311-B' in FIG. 11 is stored by the management device 30B.

As illustrated in table D311-B', each know-how ID is associated with a concealment necessity flag. The concealment necessity flag is a flag indicating whether or not concealment is required. A piece of know-how information whose concealment necessity flag is "Yes" indicating that it is required to be concealed is required to be concealed and then transmitted to another support device 30. A piece of know-how information whose concealment necessity flag is "No" indicating that it is required not to be concealed can be transmitted to another support device 30 even when processing for concealment has not been performed. In the table D311-B', it is set that the piece of know-how information of ID "0001" is required to be concealed to the "general affairs department" using the support device 20A. Note that each know-how ID is associated with a know-how DB 33 to be disclosed, a type of know-how information to be disclosed, and a piece of disclosure destination information indicating a destination for disclosure.

In this way, the access control information is defined for each know-how type or for each know-how ID. In a case where the access control information is defined for each know-how type, it is possible to set the crisis management support system which is a destination for disclosure and the organization which is a destination for disclosure. Further, in a case where the access control information is defined for each know-how type and each know-how ID, access determination is performed in consideration of both definitions. For example, as a determination method, various methods can be adopted such as allowing access only if both are permitted, or allowing access if one is permitted.

The know-how type information storage unit 312 stores know-how type information that defines each know-how type. FIG. 12 is a diagram illustrating an example of a data structure of the know-how type information. As illustrated in a table D312-B of FIG. 12, in the know-how type information, items of know-how DB, know-how type, and attribute types 1 to 5 are set. In this way, in the know-how type information, identification information of a know-how DB 33 for storage is associated with a know-how type. For example, as illustrated in the table D312-B, the know-how DB 33-b1 managed by the management device 30B stores pieces of know-how information corresponding to types of storm and flood damage, earthquake, and cyber. Further, the know-how DB 33-b2 stores pieces of know-how information corresponding to types of crisis response public know-how and crisis response secret know-how.

The know-how type information also defines attributes for each know-how type. The attribute types are commonly defined and used in the entire system. Note that, in the example of the table D312-B, the attribute type is indicated by characters such as "type" and "EEI", but may use an attribute ID as defined.

The know-how DB 33 registers know-how information. The know-how information is data that holds the content of know-how. The know-how information is information on a plurality of know-how types having different types and numbers of attributes. The know-how information is also data in which a corresponding know-how type and a value of attribute corresponding to the know-how type are associated with each other for each content of know-how. In addition, in the know-how information, a concealed flag indicating whether or not the content of know-how has been concealed is associated with each content of know-how.

FIG. 13 is a diagram illustrating an example of a data structure of know-how information. The know-how information illustrated in a table D313-b2 of FIG. 13 is registered in the know-how DB 33-b2 managed by the management device 30B. As illustrated in the table D313-b2, in the know-how information, items of know-how type, know-how ID, content of know-how, concealment status flag, and attributes 1 to 5 are set. The concealment status flag is a flag indicating whether concealment processing has been performed or concealment processing has not been performed. If the concealment status flag is "Done", the content of the corresponding know-how has been concealed. If the concealment status flag is "Not yet", the content of the corresponding know-how has not been concealed. A piece of know-how information in which the concealment necessity flag is "Yes" and the concealment status flag is "Not yet" is not transmitted to another support devices 30.

The control unit 32 includes an internal memory for storing programs defining various types of processing procedures and necessary data, and executes various steps of processing using them. The control unit 32 is an electronic circuit such as a CPU or MPU. The control unit 32 also includes a NIC or the like, and communicates with other devices via an electric communication line such as a LAN or the Internet. The control unit 32 includes a know-how management unit 321, an authentication processing unit 322, an access control unit 323, and a concealment processing unit 324.

When receiving a know-how search request, the know-how management unit 321 refers to the access control information, and when the requester is allowed to access the know-how DB 33 to be searched, the know-how management unit 321 searches the know-how DB 33 to be searched for the know-how information using a search condition. At this time, the know-how management unit 321 determines whether the requester is allowed to access the database to be searched and whether the requester is allowed to access the type of know-how information indicated by the know-how search request. Then, the know-how management unit 321 searches the know-how DBs 33 determined to be allowed for access for pieces of know-how information of the type indicated by the know-how search request, using the search parameter specified for each type.

Then, the know-how management unit 321 returns, to the requester, a piece of know-how information including the requester as a destination for disclosure among the pieces of know-how information searched for. When receiving the know-how search request, the know-how management unit 321 returns, to the requester, a piece of know-how information including the support device which is the requester or the organization targeted for presentation as a destination for disclosure among the pieces of know-how information searched for. At this time, the know-how management unit 321 returns the piece(s) of know-how information in which the concealment necessity flag is "Yes" indicating that it is required to be concealed and does not return the piece(s) of know-how information in which the concealment status flag is "Not yet" indicating that it has not been concealed, among the pieces of know-how information searched for. Since the management device 30 appropriately conceals the know-how, sensitive information does not leak from the know-how.

Further, when receiving a change request for organization information from the support device 20, the know-how management unit 321 changes the organization information which is the destination for disclosure of the know-how information. Then, the know-how management unit 321 receives a deletion request for organization information from the support device 20, deletes the organization information to be deleted from the destinations for disclosure of know-how information, and deletes pieces of know-how information corresponding to all the deleted destinations for disclosure from the know-how DB 33, thereby managing the know-how information properly.

When receiving the know-how search request from the support device 20, the authentication processing unit 322 authenticates access to the management device 30 based on authentication information of the support device 20.

The access control unit 323 updates the access control information of the access control information storage unit 311 according to instruction information input by an operation of a user of the management device 30 or instruction information transmitted from a host system.

The concealment processing unit 324 executes concealment processing for each content of the know-how information according to the instruction information input by the operation of the user of the management device 30 or the instruction information transmitted from the host system. Further, the concealment processing unit 324 sets the concealment necessity flag in the access control information in association with the ID of the know-how information. Further, the concealment processing unit 324 sets the concealment status flag in the know-how information held in the know-how DB 33 in association with the know-how ID.

[Processing Procedure for Know-How Presentation Processing]

Figure 14:
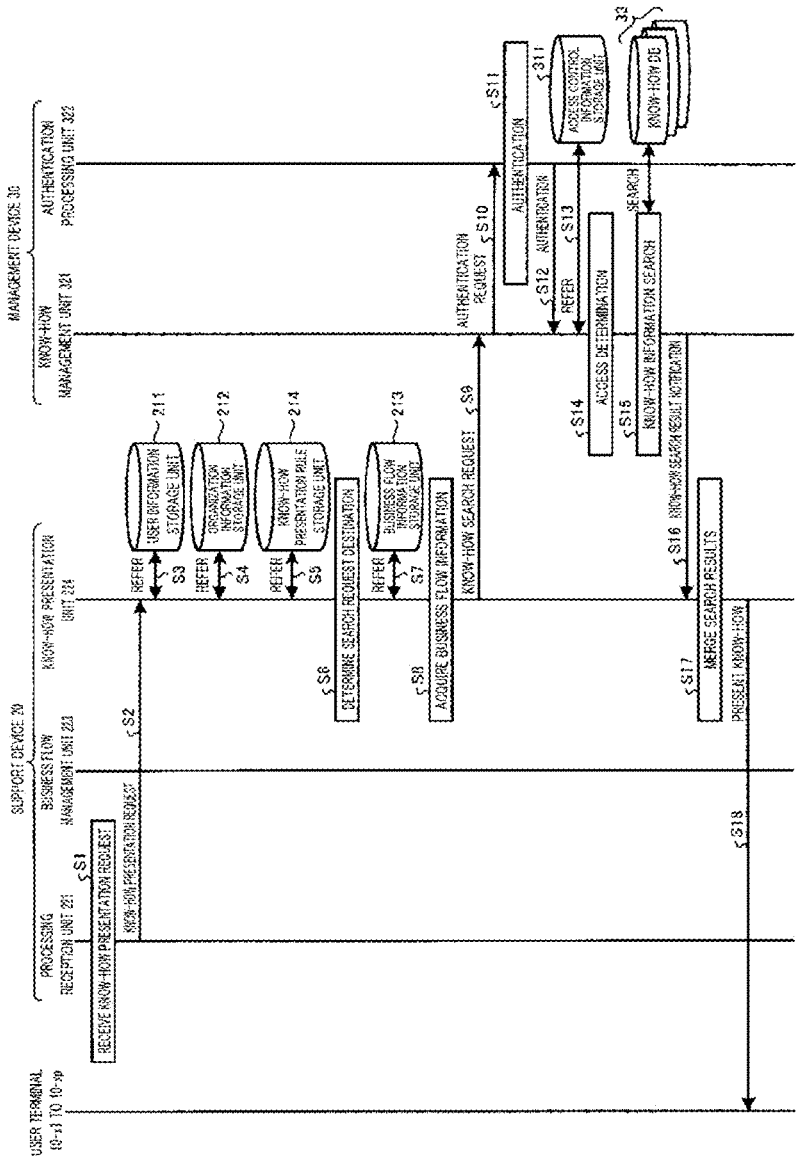
FIG. 14 is a sequence diagram illustrating a processing procedure of a crisis management support method according to the embodiment.

Next, the processing procedure for crisis management support processing in the crisis management support system 1 will be described. FIG. 14 is a sequence diagram illustrating a processing procedure of a crisis management support method according to the embodiment. In FIG. 14, it is assumed that the user terminals 10-$x1$ to 10-$xp$ of the user terminals 10 are set to ON for presentation of know-how information.

As illustrated in FIG. 14, in the support device 20, when a predetermined business triggers the processing reception unit 221 to receive a know-how presentation request (step S1), the processing reception unit 221 requests the know-how presentation unit 224 to present a know-how (step S2).

The know-how presentation unit 224 refers to the user information storage unit 211, the organization information storage unit 212, and the know-how presentation rule storage unit 214 (steps S3 to S5), and determines a search request destination (step S6). Subsequently, the know-how presentation unit 224 refers to the business flow information storage unit 213 (step S7), acquires business flow information of the business related to the know-how presentation request (step S8), and includes the business flow information as a search parameter in the know-how search request. Then, the know-how presentation unit 224 transmits a know-how search request to the management device 30 (step S9).

In the management device 30, when receiving the know-how search request, the know-how management unit 321 transits an authentication request to the authentication processing unit 322 (step S10). When the authentication processing unit 322 authenticates the support device 20 which is the requester of the know-how search request (steps S11 and S12), the know-how management unit 321 refers to the access control information storage unit 311 (step S13) and determines whether or not the support device 20 which is the requester is allowed to access the know-how DB 33 to be searched (step S14).

When the know-how management unit 321 determines that the support device 20 which is the requester is allowed to access the know-how DB 33 to be searched, the know-how management unit 321 searches, according to the search condition in the know-how search request, the know-how DB 33 to be searched for pieces of know-how information matching the search condition (step S15). Then, the know-how management unit 321 notifies the support device which is the requester of search results of the pieces of know-how information (step S16). Note that the know-how management unit 321 returns, to the support device 20 which is the requester, a piece of know-how information including the requester as a destination for disclosure among the pieces of know-how information. Here, the know-how management unit 321 returns pieces of know-how information in which the concealment necessity flag is "Yes" and does not return pieces of know-how information in which the concealment status flag is "Not yet".

The know-how presenting section 224 merges the returned pieces of know-how information (step S17) and presents the merged know-how information to the user terminals 10-x1 to 10-xp targeted for presentation (step S18).

Application Example 1

Figure 15:
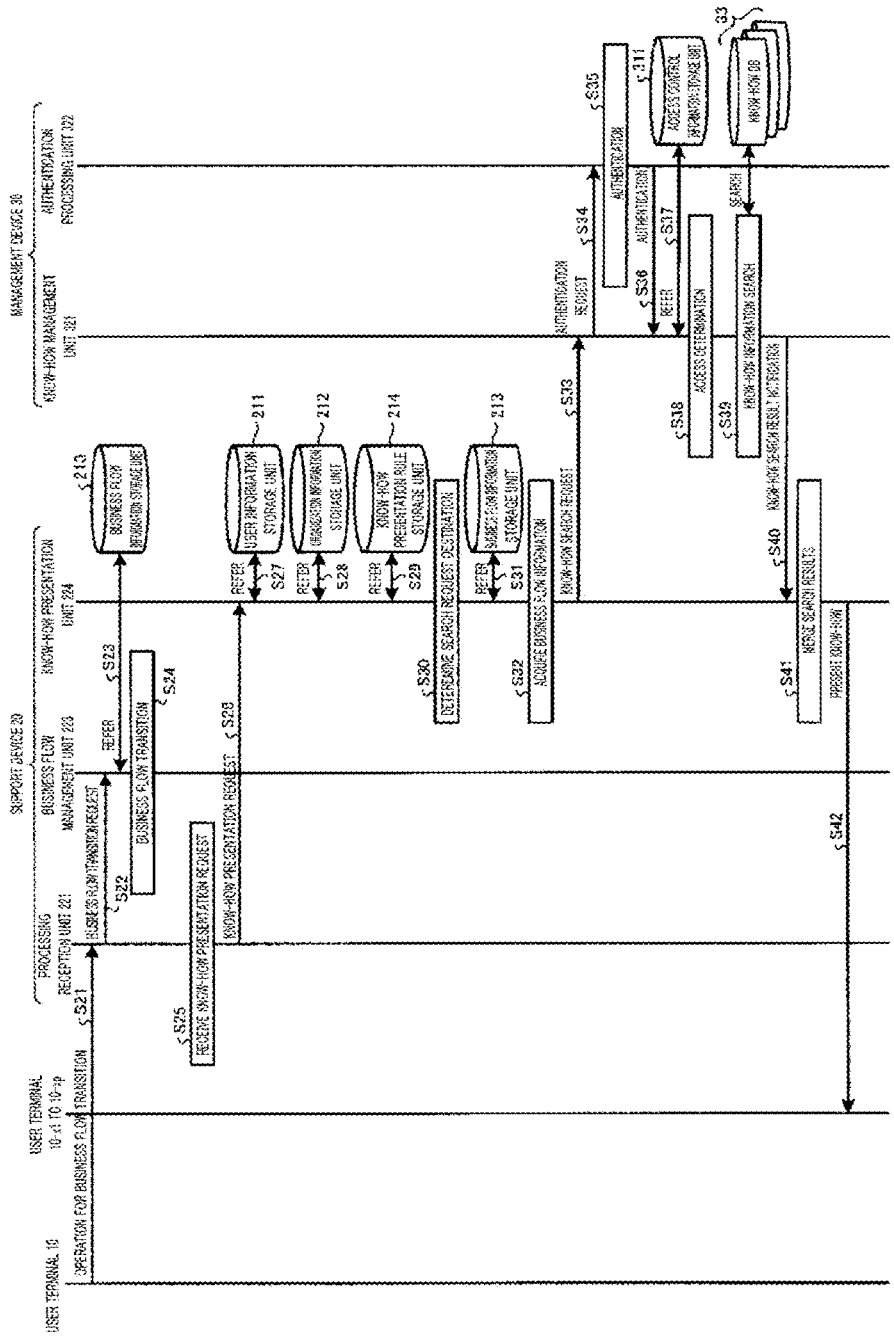
FIG. 15 is a sequence diagram illustrating an example of a processing procedure of the crisis management support method according to the embodiment.

Next, an actual application example of the crisis management support method will be described. For example, a case will be described where processing of transitioning the business flow triggers know-how information to be presented to the user terminal 10. FIG. 15 is a sequence diagram illustrating an example of a processing procedure of the crisis management support method according to the embodiment.

As illustrated in FIG. 15, when the user performs a business flow transition operation via the user terminal 10 (step S21), the processing reception unit 221 requests the business flow management unit 223 to perform business flow transition (Step S22). The business flow management unit 223 refers to the business flow information storage unit 213 (step S23) and transitions the business flow in response to the business flow transition request (step S24).

Then, the transition of the business flow triggers the processing reception unit 221 to receive a know-how presentation request (step S25), and issues a know-how presentation request triggered by the transition of the business flow to the know-how presentation unit 224 (step S26). In this case, the processing reception unit 221 transmits a know-how presentation request including a know-how presentation type indicating that it is a business flow transition time, post-transition business flow information, and search parameters including the user information.

Steps S27 to S33 illustrated in FIG. 15 are the same processing as steps S3 to S9 illustrated in FIG. 14. In this case, the know-how presentation unit 224 searches the know-how presentation rule as a key of a know-how presentation type of "business flow transition". When the know-how presentation information in FIG. 6 is searched, the know-how presentation unit 224 retrieves the items with serial numbers "1" and "2", and sets, as know-how DBs 33 to be searched, the know-how DB 33-a of the management device 30A and the know-how DB 33-b2 of the management device 30B.

For example, a case is taken as an example where the business flow is a type of "typhoon", the phase shifts from "before disaster" to "within 3 hours of disaster occurrence", and the current process is "first action". In this case, the know-how presentation unit 224 sets the search conditions for the know-how DB 33-a such that the search parameter 1 is "typhoon", the search parameter 2 is "within 3 hours of disaster occurrence", and the search parameter 3 is "first action". Further, the know-how presentation unit 224 sets search conditions for the know-how DB 33-b2 such that the search parameter 1 is "typhoon", the search parameter 2 is blank, the search parameter 3 is "within 3 hours of disaster occurrence", and the search parameter 4 is "first action".

Steps S34 to S40 illustrated in FIG. 15 are the same processing as steps S10 to S16 illustrated in FIG. 14. The management device 30A searches the know-how DB 33-a with the search conditions including the search parameter 1 "typhoon", the search parameter 2 "within 3 hours of disaster occurrence", and the search parameter 3 "first action". Further, the management device 30B searches the know-how DB 33-b2 with the search conditions including the search parameter 1 "typhoon", the search parameter 3 "within 3 hours of disaster occurrence", and the search parameter 4 "first action". At this time, the know-how management unit 321 of the management device 30A and the management device 30B performs the access determination based on the access control information of its own device, performs a know-how information search, and notifies the know-how search result.

Steps S41 and S42 illustrated in FIG. 15 are steps S17 and S18 illustrated in FIG. 14. In the support device 20, the know-how presentation unit 224 merges the two search results when the search results are returned from the management devices 30A and 30B. Then, the know-how presentation unit 224 presents the know-how to the user terminals 10-x1 to 10-xp of users who belong to the same organization as the user who has performed the business flow transition, in accordance with the know-how presentation rule of serial numbers "1" and "2" in FIG. 6.

In this way, FIG. 15 illustrates the processing procedure related to presentation of know-how information at the business flow transition. In this case, the know-how presentation unit 224 searches the know-how presentation rule as a key of a know-how presentation type of "business flow transition" and sets the management device 30 and the know-how DB 33 to be searched, the type of know-how information to be searched for, and the search parameters.

Here, in the crisis management business, in order to carry out the business smoothly, a business flow of how to carry out the business may be created in advance so that the business can be performed according to the business flow. In light of which part of the sequential business flow is being performed, the business to be carried out at present will change. As illustrated in FIG. 15, the support device 20 searches for and presents know-how with the content of the business flow as a parameter at the time of the transition of the business flow, thereby making it possible to search for know-how related to the business to be carried out in the business flow which is a transition destination.

Application Example 2

Next, an example of presenting know-how as periodic execution will be described. In other words, the processing reception unit 221 periodically issues a know-how presentation request to the know-how presentation unit 224 as a trigger for calling the know-how presentation request. In this case, the processing reception unit 221 requests the user who uses the board to present a know-how by using, as a search parameter, information on business flow currently being executed and information on a business flow to be executed next.

The know-how presentation unit 224 searches the know-how presentation rule for serial number "3" in FIG. 6 and sets the search parameters for the know-how DB 33-*a*. The know-how presentation unit 224 requests the management device 30A to perform a know-how search with the search conditions including the search parameters. Accordingly, the know-how presentation unit 224 makes it possible to present a know-how indicating what to do to the user who is carrying out the business based on know-how information returned in response to the request.

Application Example 3

Figure 16:
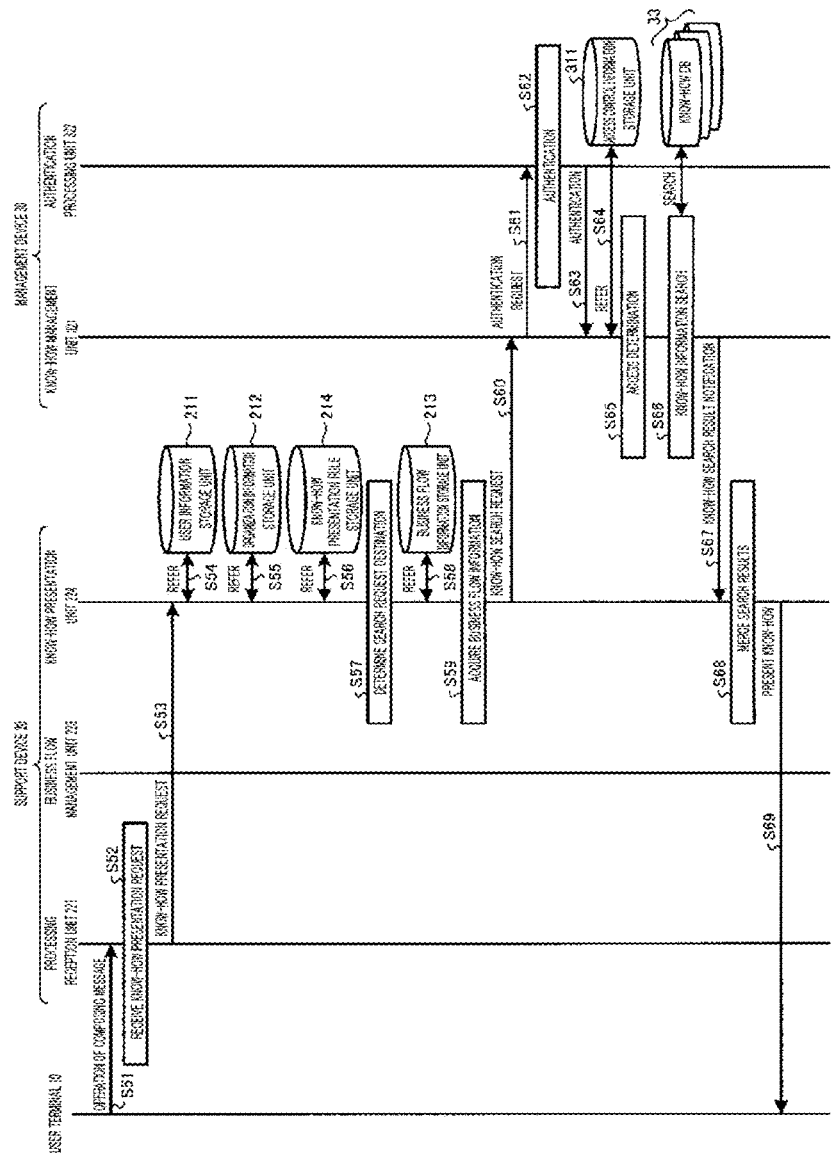
FIG. 16 is a sequence diagram illustrating an example of a processing procedure of the crisis management support method according to the embodiment.

Next, a case will be described where know-how information is presented to the user terminal 10 when the user composes a message. FIG. 16 is a sequence diagram illustrating an example of a processing procedure of the crisis management support method according to the embodiment.

As illustrated in FIG. 16, when the user performs an operation of composing a message via the user terminal 10 (step S51), composing the message triggers the processing reception unit 221 to receive a know-how presentation request (step S52) and to request the know-how presentation unit 224 to present a know-how triggered by composing the message (step S53). Specifically, when the user composes a message for an instruction on or answer to a crisis response, the processing reception unit 221 requests the know-how presentation unit 224 to present a know-how using, as search parameters, information included in a message currently drafted, to the user who is drafting the message.

Steps S54 to S69 illustrated in FIG. 16 are the same processing as steps S3 to S18 illustrated in FIG. 14. In this case, the know-how presentation unit 224 searches the know-how presentation rule of FIG. 6 as a key of a know-how presentation type of "when composing message". In this example, the know-how presentation unit 224 retrieves the items with serial number "4", sets, as the search target, the know-how DB 33-*a* of the management device 30A, and sets search conditions including a search parameter of "message content". The know-how presentation unit 224 requests the management device 30A to perform a know-how search with the search conditions including the search parameters. Accordingly, the know-how presentation unit 224 makes it possible to present a know-how indicating what to do to the user terminal of the user who is composing a message based on know-how information returned in response to the request.

Application Example 4

Figure 17:
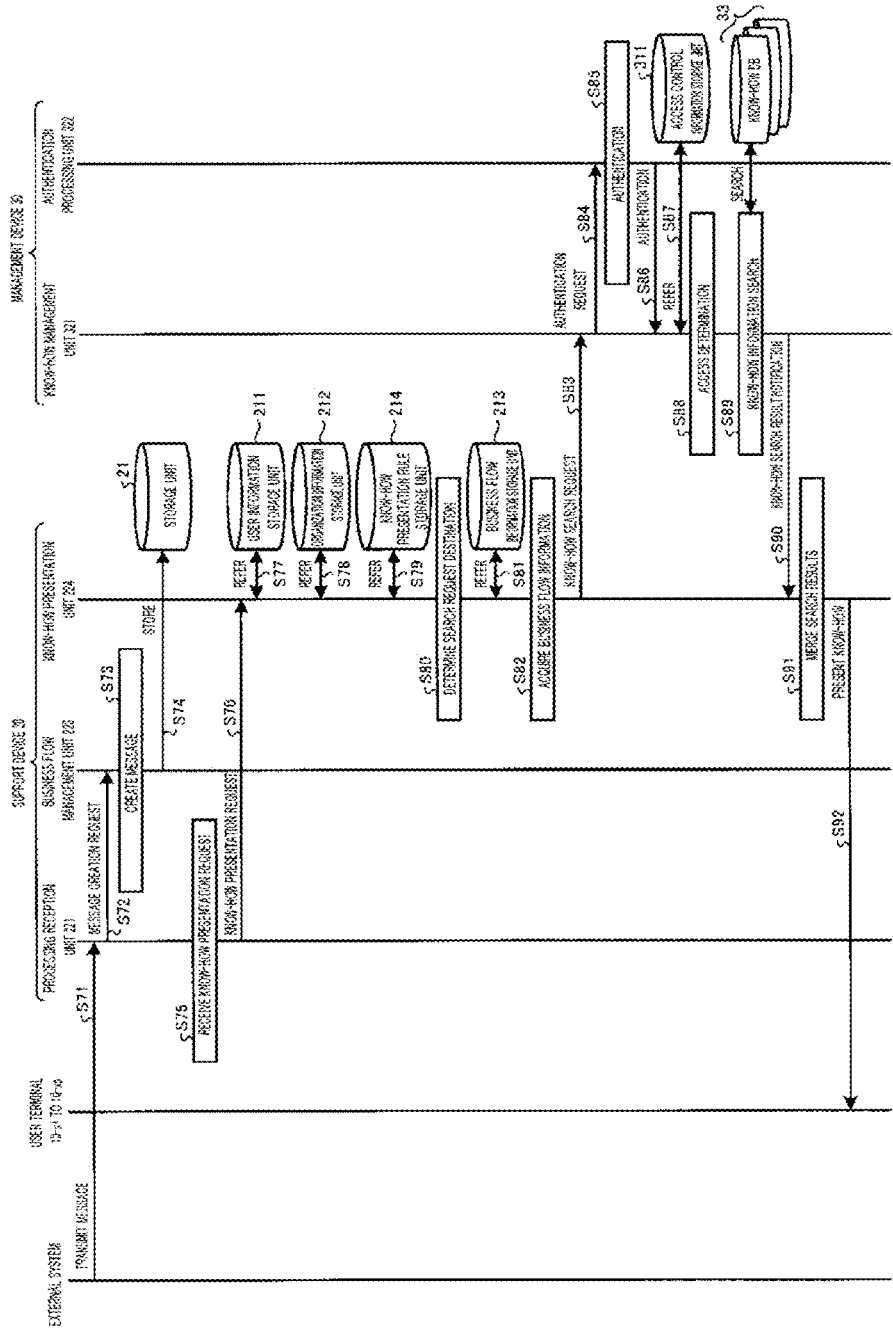
FIG. 17 is a sequence diagram illustrating an example of a processing procedure of the crisis management support method according to the embodiment.

Next, a case will be described where receiving a message triggers know-how information to be presented to the user terminal 10. FIG. 17 is a sequence diagram illustrating an example of a processing procedure of the crisis management support method according to the embodiment.

As illustrated in FIG. 17, when an external system sends an e-mail to the support device 20 (step S71), the processing reception unit 221 requests a message management unit to create a message for the corresponding board (step S72). In response to this, the message management unit creates a message (step S73) and stores the message in the board of the storage unit 21 (step S74). Then, the processing reception unit 221 receives a know-how presentation request (step S75), and requests the know-how presentation unit 224 to present a know-how to the manager of the board using, as search parameters, the message content and the business flow information (Step S76).

Steps S77 to S92 illustrated in FIG. 17 are the same processing as steps S3 to S18 illustrated in FIG. 14. In this case, the know-how presentation unit 224 searches the know-how presentation rule of FIG. 6 as a key of a know-how presentation type of "when receiving message". In this example, the know-how presentation unit 224 retrieves the items with serial number "5", sets, as the search target, the know-how DB 33-*a* of the management device 30A, and sets search conditions including a search parameter of "message content". The know-how presentation unit 224 requests the management device 30A to perform a know-how search with the search conditions including the search parameters. Accordingly, the know-how presentation unit 224 makes it possible to present know-how information related to the message to the user terminals 10-*x*1 to 10-*xp* of the users (e.g., the board managers) who can confirm the message from the external system, based on the know-how information returned in response to the request.

Further, the support device 20 later makes use of the message created for performing the business as a know-how. In this case, the support device 20 records the business flow information at the time of creating the message together with the message so that the above-described search can be appropriately performed. The support device 20 preferably registers the business flow information as well when registering the message as know-how information in the crisis response information management system.

In the crisis management support system 1, the support device 20 allows for defining a free search keyword as in the know-how presentation rule illustrated in FIG. 6, thereby making it possible to use search keywords in which a type, a message content, a process, and a phase are set for search. Further, the support device 20 makes it possible to provide such a manner that the search keyword is, for example, only the message content, and the type, process, and phase are used by the user for filtering the search results on the screen.

Advantageous Effects of Embodiment

As described above, in the crisis management support system 1 according to the present embodiment, the support device 20 that presents know-how information to the user requests a plurality of management devices 30 owned by other companies or other municipalities that manage know-hows to search for a know-how, merges the search results returned in response to the request, and presents the resulting information to the user. Therefore, according to the present embodiment, it is possible to execute a cross search among know-hows having different attributes depending on municipalities/companies.

Further, the support device 20 stores a know-how presentation rule in which a database to be searched, a search condition, and a user terminal to be targeted for presentation are set in accordance with a presentation type indicating which business a presentation request for know-how information is requested for. Then, the support device 20 automatically determines a timing at which the search is required by setting the business flow indicating what kind of business is currently being carried out as a search parameter, and automatically presents a search result of the know-how information to the user terminal 10 of the user who needs a know-how. Therefore, the user can automatically obtain the know-how information about the related business without performing any search operation.

Further, each management device 30 strictly manages the disclosure of know-how information by using the control information in which the database to be disclosed and the type of know-how information to be disclosed are associated with the disclosure destination information indicating a destination for disclosure. Further, each management device 30 attends, to the control information, a concealment necessity flag indicating whether or not concealment is required, and to each piece of know-how information, a concealment status flag indicating either concealed or unconcealed, and excludes know-how information that is required to be concealed and has not been concealed from the search results. As described above, according to the present embodiment, it is possible to appropriately conceal the know-hows so that sensitive information is not leaked from the know-hows.

As described above, according to the present embodiment, a know-how search is performed using a plurality of management devices 30 for the user terminal 10 of the proper user at various timings such as when composing a message or when changing the business flow, and then the know-how information retrieved is automatically presented. Therefore, according to the present embodiment, it is possible to present know-how information accumulated among a plurality of organizations to a user at an appropriate timing in responding to a crisis. In particular, in the present embodiment, past know-hows can be presented to an inexperienced user at an appropriate timing and with appropriate content, and thus, appropriate crisis management support can be provided.

[System Configuration, etc.]

Further, each component of each device illustrated is a functional concept and does not necessarily need to be physically configured as illustrated. In other words, a specific form of distribution and integration of the devices is not limited to the illustrated one, and all or a part thereof may be functionally or physically distributed or integrated on any unit basis in accordance with various loads and usage conditions. Further, all or any part of each processing function performed by each device can be implemented by a CPU and a program analyzed and executed by the CPU, or can be implemented as hardware by wired logic.

Further, among the processing described in the embodiment, all or a part of the processing described as being performed automatically can be manually performed, or all or a part of the processing described as being performed manually can be performed automatically by a known method. In addition, the processing procedures, control procedures, specific names, and information including various data and parameters described in the above documents and drawings can be arbitrarily changed unless otherwise specified.

[Program]

Figure 18:
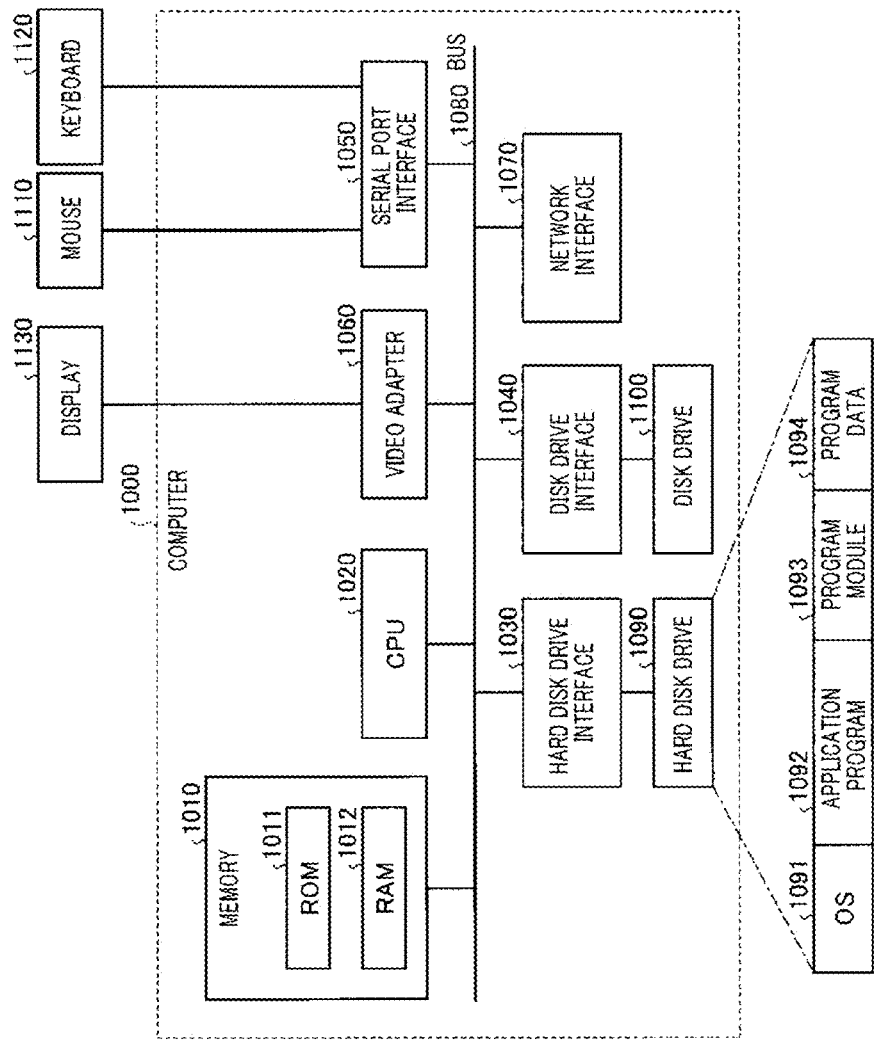
FIG. 18 is a diagram illustrating an example of a computer in which the support device and the management device are implemented by executing a program.

FIG. 18 is a diagram illustrating an example of a computer in which the support device 20 and the management device 30 are implemented by executing a program. A computer 1000 includes, for example, a memory 1010 and a CPU 1020. The computer 1000 includes a hard disk drive interface 1030, a disk drive interface 1040, a serial port interface 1050, a video adapter 1060, and a network interface 1070. These components are connected by a bus 1080.

The memory 1010 includes a ROM (Read Only Memory) 1011 and a RAM 1012. The ROM 1011 stores, for example, a boot program such as a BIOS (Basic Input Output System). The hard disk drive interface 1030 is connected to a hard disk drive 1090. The disk drive interface 1040 is connected to a disk drive 1100. For example, a removable storage medium such as a magnetic disk or an optical disk is inserted into the disk drive 1100. The serial port interface 1050 is connected to, for example, a mouse 1110 and a keyboard 1120. The video adapter 1060 is connected to, for example, a display 1130.

The hard disk drive 1090 stores, for example, an OS 1091, an application program 1092, a program module 1093, and program data 1094. Accordingly, a program that defines each processing in the support device 20 and the management device 30 is implemented as the program module 1093 in which codes executable by the computer 1000 are described. The program module 1093 is stored in, for example, the hard disk drive 1090. For example, the program module 1093 for executing processing corresponding to the functional configuration of the support device 20 or the management device 30 is stored in the hard disk drive 1090. Note that the hard disk drive 1090 may be replaced with an SSD (Solid State Drive).

Further, setting data used in the processing in the above-described embodiment is stored as the program data 1094 in, for example, the memory 1010 or the hard disk drive 1090. Then, the CPU 1020 loads the program module 1093 and the program data 1094 stored in the memory 1010 or the hard disk drive 1090 into the RAM 1012 as necessary, and executes them in the above-described procedures.

Note that the program module 1093 and the program data 1094 are not limited to being stored in the hard disk drive 1090, but may be stored in, for example, a removable storage medium and read out by the CPU 1020 via the disk drive 1100 or the like. Alternatively, the program module 1093 and the program data 1094 may be stored in another computer connected via a network (LAN, WAN, etc.). Then, the program module 1093 and the program data 1094 may be read from the other computer by the CPU 1020 via the network interface 1070.

Although the above description is for the embodiment to which the invention made by the inventor(s) is applied, the present invention is not limited by the description and the drawings forming part of the disclosure of the present invention according to the present embodiment. That is, all other embodiments, examples, operation techniques and the like to be made by those skilled in the art based on the present embodiment are included in the scope of the present invention.

REFERENCE SIGNS LIST

1 Crisis management support system
10, 10-1 to 10-$n$, 10-$x$1 to 10-$xp$ User terminal 20, 20A, 20B, 20C Support device
21, 31 Storage unit
22, 32 Control unit
30, 30A, 30B, 30C Management device
33 Know-how DB
40 Communication network
211 User information storage unit
212 Organization information storage unit
213 Business flow information storage unit
214 Know-how presentation rule storage unit
221 Processing reception unit
222 Organization management unit
223 Business flow management unit
224 Know-how presentation unit
311 Access control information storage unit
312 Know-how type information storage unit
321 Know-how management unit
322 Authentication processing unit
323 Access control unit
324 Concealment processing unit

The invention claimed is:

1. A support system comprising: a support device that presents know-how information related to crisis management business to a user terminal; and a management device that manages the know-how information, wherein the support device includes a processing reception unit that receives a presentation request for the know-how information;
a first storage unit that stores a presentation rule in which a database to be searched, a search condition, and a user terminal to be targeted for presentation are set in accordance with a presentation type indicating which business the presentation request is requested for; and a know-how presentation unit that transmits, based on the presentation rule in response to receiving the presentation request, a know-how search request including the search condition corresponding to the presentation type in the presentation request to a management device of the database to be searched corresponding to the presentation type, integrates pieces of know-how information returned in response to the know-how search request, and presents the integrated know-how information to the user terminal to be targeted for presentation, and the management device includes a database that registers the know-how information; a second storage unit that stores first control information in which a database to be disclosed and a type of know-how information to be disclosed, and disclosure destination information indicating a destination for disclosure are associated with each other; and know-how management unit that refers to the first control information in response to receiving the know-how search request, searches the database to be searched for pieces of know-how information when the requester is allowed to access the database to be searched, and returns to the requester a piece of know-how information to be disclosed to the requester as a destination for disclosure among the pieces of know-how information searched for.

2. The support system according to claim 1, wherein the presentation rule includes, as user terminals targeted for presentation, in addition to a user terminal that is the requester, a user terminal belonging to the same organization as the user terminal that is the requester as well as a user terminal that shares the same business flow with the user terminal that is the requester, the know-how presentation unit includes, when receiving the presentation request, organization information indicating an organization targeted for presentation as a search condition in the know-how search request, integrates the pieces of know-how information returned in response to the know-how search request, and presents the integrated know-how information to a user terminal to which the know-how information is permitted to be presented among the user terminals to be targeted for presentation, the first control information includes, as the disclosure destination information, information on the support device which is a destination for disclosure or organization information of a destination for disclosure, and the know-how management unit returns, when receiving the know-how search request, to the requester, a piece of know-how information including the support device that is the requester or the organization targeted for presentation as a destination for disclosure among the pieces of know-how information searched for.

3. The support system according to claim 2, wherein the database stores, as the know-how information, a plurality of types of pieces of know-how information having different types and numbers of attributes, the first control information associates a type of know-how information with the support device which is a destination for disclosure and the organization information of a destination for disclosure, the know-how presentation unit includes a type of know-how information and a search parameter specified for each type as search conditions in the know-how search request, and the know-how management unit determines, when receiving the know-how search request, whether or not the requester is allowed to access the database to be searched and whether or not the requester is allowed to access a piece of know-how information of the type indicated by the know-how search request, and searches databases determined to be allowed to access the piece of know-how information of the type indicated by the know-how search request, using the search parameter specified for each type.

4. The support system according to claim 2, wherein the support device further includes an organization management unit that manages organization information indicating organizations managed by the support device, and transmits, when a content of the organization information is changed, a change request for the organization information to the related management device, and the know-how management unit receives the change request for the organization information from the support device, and changes the organization information which is a destination for disclosure destination of the know-how information.

5. The support system according to claim 4, wherein the organization management unit transmits, when a piece of organization information is deleted, a delete request for the piece of organization information related to the support device to the related management device, and the know-how management unit receives the deletion request for organization information from the support device, deletes the piece of organization information to be deleted from destinations for disclosure of the know-how information, and deletes pieces of know-how information corresponding to all the deleted destinations for disclosure from the database.

6. The support system according to claim 1, wherein the second storage unit stores second control information in which identification information of know-how information and a concealment necessity flag indicating whether concealment is required are associated with each other, a concealment status flag is set for each piece of know-how information, the concealment status flag indicating whether concealment processing has been performed or concealment processing has not been performed, and the know-how management unit does not return a piece of know-how information in which the concealment necessity flag indicates that concealment is required and the concealment status flag indicates that concealment processing has not been performed, among the pieces of know-how information searched for.

7. A support method performed in a support system that includes a support device that presents know-how information related to crisis management business to a user terminal, and a management device that manages the know-how information, wherein the support system includes a first storage unit that stores a presentation rule in which a database to be searched, a search condition, and a user terminal to be targeted for presentation are set in accordance with a presentation type indicating which business a presentation request for the know-how information is requested for, the management device includes a database that stores the know-how information; and a second storage unit that stores control information in which a database to be disclosed and a type of know-how information to be disclosed, and disclosure destination information indicating a destination for disclosure are associated with each other, the method comprising the steps of: receiving, by the support device, the presentation request; transmitting, by the support device, based on the presentation rule in response to receiving the presentation request, a know-how search request including the search condition corresponding to the presentation type in the presentation request to a management device of the database to be searched corresponding to the presentation type, integrating pieces of know-how information returned in response to the know-how search request, and presenting the integrated know-how information to the user terminal to be targeted for presentation; and referring to, by the management device, the control information in response to receiving the know-how search request, searching the database to be searched for pieces of know-how information using the search conditions when the requester is allowed to access the database to be searched, and returning to the requester a piece of know-how information to be disclosed to the requester as a destination for disclosure among pieces of know-how information searched for.

* * * * *